(No Model.)
J. M. SMITH.
PRESSURE INDICATING INFLATOR OR AIR PUMP.
No. 544,998. Patented Aug. 20, 1895.
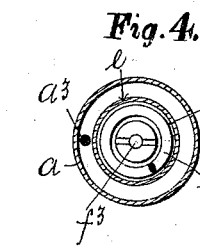
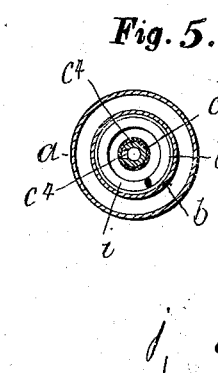
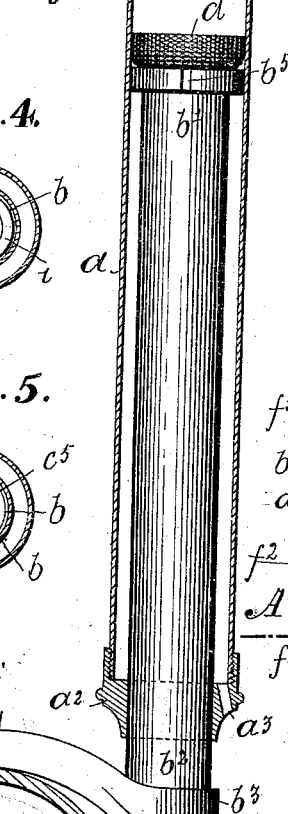
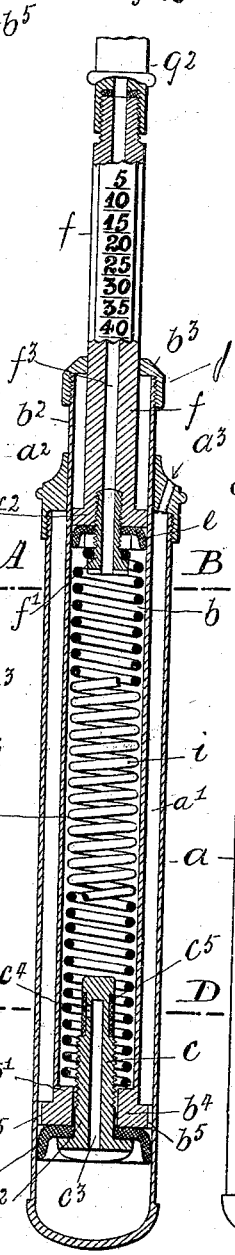
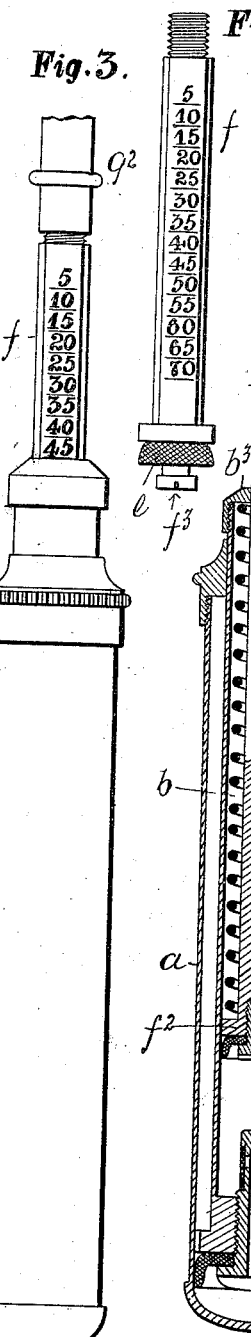
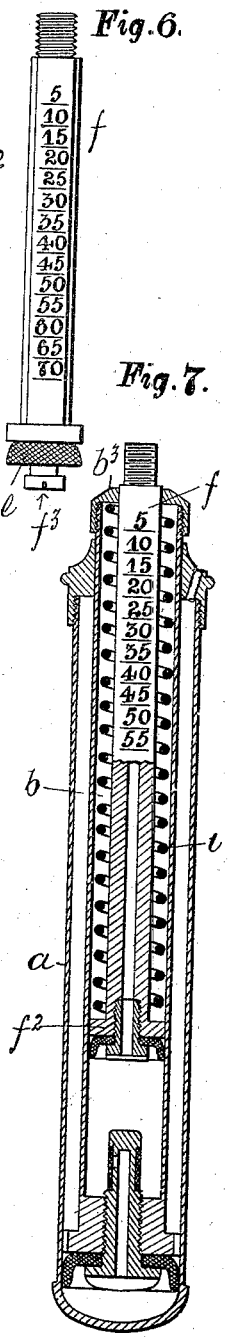
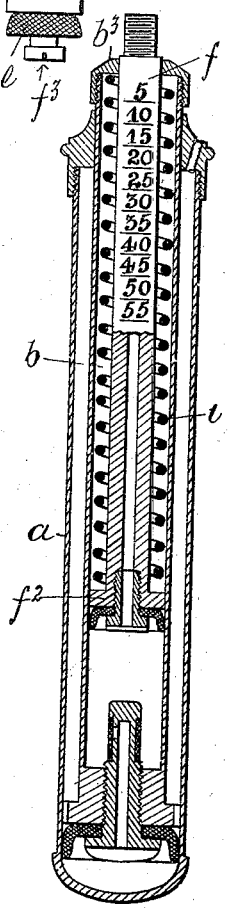
WITNESSES
Arthur T. Sadler
George Thomas Furey
INVENTOR
John Milbrowe Smith

UNITED STATES PATENT OFFICE.

JOHN MILBROWE SMITH, OF WEST BROMWICH, ENGLAND.

PRESSURE-INDICATING INFLATOR OR AIR-PUMP.

SPECIFICATION forming part of Letters Patent No. 544,998, dated August 20, 1895.

Application filed March 1, 1893. Serial No. 464,248. (No model.) Patented in England September 27, 1892, No. 17,196; in France December 22, 1892, No. 226,725, and in Germany January 6, 1893, No. 71,598.

*To all whom it may concern:*

Be it known that I, JOHN MILBROWE SMITH, cycle-manufacturer, a subject of the Queen of Great Britain, residing at High Street, West Bromwich, in the county of Stafford, England, have invented certain new and useful Pressure-Indicating Inflators or Air-Pumps; and I do hereby declare the following to be a full, clear, and exact description of the invention, reference being had to the accompanying drawings, which form part of this specification, and for which invention Letters Patent have been granted as follows: in Great Britain September 27, 1892, No. 17,196; in France December 22, 1892, No. 226,725, and in Germany January 6, 1893, No. 71,598.

My invention relates to inflators or air-pumps for injecting air under compression into pneumatic tires, life-buoys, footballs, air-pillows, and other like articles requiring to be inflated, and has for its object a means of indicating the actual pressure of injected air within the said articles. Thus in ordinary inflators or air-pumps the pressure of the injected air is only ascertained approximately by the force it takes to work the instrument, and by relying upon such rough-and-ready means pneumatic tires and the like are oftentimes so extended as to burst.

Figure 1 of the accompanying drawings represents, partly in vertical section and partly in elevation, a pressure or indicating or registering inflator constructed, arranged, and combined according to my invention. A portion of the instrument, which has a bracket-arm, is shown resting upon a tire and in the position which it takes when the said tire is being inflated. Fig. 2 represents a complete longitudinal vertical section of the said indicating-inflator. Fig. 3 is an elevation of the indicating end portion of the same. Fig. 4 is a transverse vertical section on the dotted lines A B, Fig. 2. Fig. 5 represents a transverse section on the dotted lines C D, Fig. 2. Fig. 6 represents the indicating-stalk with scale upon it. Fig. 7 is a transverse vertical sectional view of a modified form of my invention.

$a$ is an outside and tubular casing, constituting the forcing casing and handle of the instrument, with a nozzle end $a^2$, having an air-inlet $a^3$, leading to the chamber of said forcing-casing. Working telescopically within the interior of the said forcing-casing $a$ is a pressure-chamber $b$, consisting, essentially, of a tubular inner casing, closed at one end $b'$ by an inlet and check-valve tube $c$ and at the other end $b^2$ by a cap $b^3$. The end $b'$, which has a solid piston-like end $b^4$, has small air-inlet holes $b^5$, and has upon its front side a cup-leather piston $d$, clamped or affixed in position by the valve-stem $c^2$, which has up its middle inlet-passages $c^3$ $c^4$, and which latter passage is covered by an expanding rubber sleeve $c^5$, constituting primarily the valve. Working within the other end $b^2$ of the said pressure-chamber $b$ is a cup-leather piston $e$, carried by the inner and piston end $f^2$ of a hollow indicating-stalk $f$, having up its middle an air-passage $f^3$, leading to a flexible connection $g$, having screwed fittings $g^2$ $g^3$, and with the latter taking upon the nipple of the neck of the check-valve of the pneumatic tire $h$. This stalk works telescopic or piston-like within the pressure-chamber and through the end cap $b^3$ of the said chamber, and located within the interior of the said pressure-chamber, and with its ends connected to the hollow stems $f'$ $c^2$, carried, respectively, by the indicator-stalk $f$ and pressure-chamber $b$, is a coiled spring $i$, which is distended in proportion to the pressure of the injected air. Thus, assuming that the figures of the scale represent the pressure in pounds to the square inch, and assuming, also, that the injected air is at forty pounds, then the figure "40" will be presented through the cap $b^3$, and so likewise will other figures, according to the pressure, and as the pressure increases so the coiled spring $i$ becomes gradually distended, as the impelling force of the air is confined between the cup-leather $e$ and the inside of the pressure-chamber. It is thus understood that one end of the spring is affixedly connected to the indicating-stalk and the other end to the bottom of the pressure-chamber, so that as the pressure increases so the piston end $e$ is forced outwardly; hence the stretching or distending of the spring, which is equivalent to, and registers by the scale, the extent to which the injected air is under compression.

Connected to the outer end of the pressure-chamber is a bracket-arm $j$, which forms the bearing by which the instrument is supported, and when in use the same is simply pressed against the tire and the casing $a$ first drawn out and then propelled forward, so that the instrument in working is held up to the tire by the one hand and the inflator worked by the other.

Assuming the instrument, which is open to the atmosphere, to be in the position Fig. 2, the pulling outward of the outer casing $a$ draws air through the hole $a^3$ up the space $a'$, as indicated by the direction of the arrows, through the holes $b^5$, past the edges of the cup-leather $d$, and then into the pressure-chamber $b$. By now forcing the casing $a$ forward the air behind the cup-leather has become trapped, and is then by the force applied diminished in volume and increased in pressure, forced up the passage $c^3$ of the valve $c$ through the passage $c^4$, lifting the rubber valve-sleeve $c^5$, and from thence forced into the pressure-chamber $b$, up the passage $f^3$, through the connection $g$, into the tire $h$, and is then trapped by the ordinary check-valve, and as the injected air is at this moment of the same pressure within the chamber $b$ as within the tire $h$ the stalk $f$ is forced outwardly, the spring $i$ distended or stretched proportionate to the said inside pressure, and the actual air-pressure within the tire indicated by the numeral of the scale adjacent to the cap $b^3$, so that, assuming the pressure of air within the pump and tire to be twenty pounds to the square inch, then the stalk will be forced outwardly until the figure "20" just projects above the cap.

In the modification shown in Fig. 7 the spring for indicating the pressure is compressed instead of being distended.

$a$ is the outer casing; $b$, the pressure-chamber; $f$, the stalk, and $i$ a coiled spring disposed between the end cap $b^3$ of the compression-chamber $b$ and the piston end $f^2$ of the indicating-stalk $f$.

Having fully described my invention, what I desire to claim and secure by Letters Patent, is—

1. An inflator or air pump, having a pressure indicator, consisting of a telescopic and graduated stalk or piston and a spring, in combination with a pump barrel and piston relatively movable and communicating motion to said stalk through the air compressed in the pump, substantially as described.

2. In an indicating inflator or air pump, the combination of a forcing casing, a pressure chamber, and a scaled stalk, with a spring, disposed and connected between the said stalk and pressure chamber, as set forth.

3. In an indicating inflator or air-pump, the combination of an exterior casing, an interior casing, having a piston end and check valve, a graduated stalk having a piston end working in said interior casing and a spring arranged within the interior casing and adapted to maintain the graduated stalk against the air pressure within the inflator substantially as described.

In testimony that I claim the foregoing I have hereunto set my hand this 28th day of January, 1893.

JOHN MILBROWE SMITH.

Witnesses:
ARTHUR T. SADLER,
GEORGE THOMAS FUERY.